United States Patent
Young et al.

(10) Patent No.: US 9,744,986 B2
(45) Date of Patent: Aug. 29, 2017

(54) STEERING ARRANGEMENT

(71) Applicant: J. C. Bamford Excavators Limited, Rocester, Uttoxeter, Staffordshire (GB)

(72) Inventors: Richard Frederick George Young, Uttoxeter (GB); Nathan James Clarke, Uttoxeter (GB); Richard Edward Cadman, Uttoxeter (GB)

(73) Assignee: J. C. Bamford Excavators Limited, Uttoxeter, Staffordshire (GB)

(*) Notice: Subject to any disclaimer, the term of this patent is extended or adjusted under 35 U.S.C. 154(b) by 285 days.

(21) Appl. No.: 14/333,312

(22) Filed: Jul. 16, 2014

(65) Prior Publication Data

US 2015/0021116 A1    Jan. 22, 2015

(30) Foreign Application Priority Data

Jul. 22, 2013    (GB) .................................. 1313041.4

(51) Int. Cl.
    *B62D 5/00*      (2006.01)
    *B62D 5/093*      (2006.01)
    *A01B 69/00*      (2006.01)
    *B62D 5/30*      (2006.01)

(52) U.S. Cl.
CPC ............ *B62D 5/008* (2013.01); *A01B 69/007* (2013.01); *B62D 5/093* (2013.01); *B62D 5/30* (2013.01)

(58) Field of Classification Search
CPC .......... B62D 5/008; B62D 5/30; B62D 5/093
See application file for complete search history.

(56) References Cited

U.S. PATENT DOCUMENTS 6,279,675 B1    8/2001    Bohner et al.
6,502,661 B1    1/2003    Heitzer
(Continued)

FOREIGN PATENT DOCUMENTS

CN      202169962 U    3/2012
DE      198 44 331 A1    4/2000
(Continued)

OTHER PUBLICATIONS

Search Report for GB 1313041.4, dated Feb. 5, 2014.
(Continued)

*Primary Examiner* — Kevin Hurley
(74) *Attorney, Agent, or Firm* — Marshall, Gerstein & Borun LLP (57) ABSTRACT

A steering arrangement including a first, second, third and fourth hydraulic chamber, the first and third chambers being operable to steer in a first direction and the second and fourth chambers being operable to steer in a second direction. A pump system supplies fluid to a steering system, which is operable to supply the pressurized fluid to one or more of the first, second, third and fourth hydraulic chambers. The steering system having a first mode wherein fluid is supplied to the first and third hydraulic chambers to steer in the first direction, or pressurized fluid is supplied to the second and fourth hydraulic chambers to steer in the second direction. The steering system having a second mode to steer in the first direction, or to steer in the second direction, such that the steering ratio is higher in the second mode than in the first mode.

18 Claims, 11 Drawing Sheets

(56) References Cited

U.S. PATENT DOCUMENTS

| | | | |
|---|---|---|---|
| 7,837,001 B2* | 11/2010 | Young | B62D 5/093 |
| | | | 180/441 |
| 8,925,672 B2* | 1/2015 | Bebernes | B62D 11/04 |
| | | | 180/403 |
| 2009/0038876 A1 | 2/2009 | Ito et al. | |

FOREIGN PATENT DOCUMENTS

| | | |
|---|---|---|
| EP | 1 988 004 A2 | 11/2008 |
| GB | 1 380 354 A | 1/1975 |
| GB | 2294669 A | 5/1996 |
| GB | 2322608 A | 9/1998 |
| GB | 2339178 A | 1/2000 |
| GB | 2 345 044 A | 6/2000 |
| WO | WO-2013/049582 A2 | 4/2013 |

OTHER PUBLICATIONS

Extended European Search Report for EP 14 17 7220, mailed Dec. 11, 2014.
Second Search Report for GB 1313041.4, dated Sep. 9, 2014.

* cited by examiner

STEERING ARRANGEMENT

FIELD OF THE INVENTION

The present invention relates to a steering arrangement.

BACKGROUND OF THE INVENTION

A steering arrangements are known whereby a vehicle includes a manually operable steering wheel. The steering wheel is mechanically connected to the ground engaging steerable wheels in order to steer the vehicle.

It is also known to provide a hydraulic steering system whereby a steering wheel is hydraulically coupled to steerable wheels of a vehicle. In the event of a hydraulic leak, suitable precautions must be taken to ensure the vehicle is still steerable. One such arrangement is to provide a redundant system, i.e. to provide two steering systems in parallel and in the event there is a failure of one of the steering systems, then the other steering system will be able to steer the vehicle.

When the vehicle is operating normally, there will be a predetermined steering ratio, i.e. in order to turn the steered wheels from full left hand lock to full right hand lock will require a predetermined number of turns of the steering wheel.

Under some circumstances, in particular when hydraulic pumps are no longer able to supply pressurised fluid, it is known to arrange the system such that there is no power assistance on the steering. Under these circumstances it becomes harder for the operator to steer the vehicle and accordingly the steering ratio is arranged to become a lower ratio thereby allowing the operator to more easily steer the vehicle, albeit requiring more turns of the steering wheel for a particular steering input.

Thus, it is known to arrange for the steering to have a normal steering ratio and a lower steering ratio under particular circumstances.

Certain vehicles, in particular agricultural vehicles, when carrying out certain agricultural operations, such as ploughing or spraying in a field, will traverse the field in a generally straight line but at a "headland" such as at the edge of the field, the vehicle will be required to turn a tight circle and return in a direction for which it has just come, in order to continue ploughing, spraying or the like. Under such circumstances, the operator is required to turn the steering wheel quickly and this can be tiresome and/or the operator may not be able to turn the steering wheel quickly enough.

Furthermore, when agricultural vehicles are carrying out agricultural operations in a field, such as ploughing or spraying, it is advantageous for them to be steered by an automatic steering system, such as a GPS system, since such automatic systems may be more accurate than manual steering.

SUMMARY

The invention will now be described, by way of example only, with reference to the accompanying drawings in which:

DETAILED DESCRIPTION OF THE INVENTION

Figure 1:
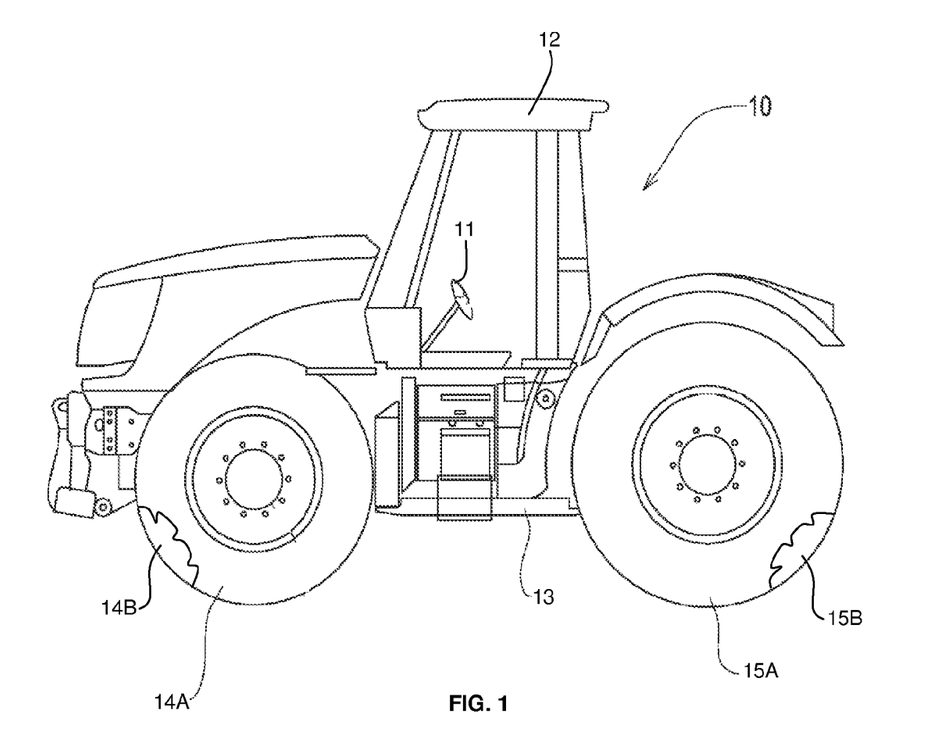
FIG. 1 is a view of a vehicle including a steering arrangement according to the present invention.

With reference to FIG. 1, there is shown a vehicle 10 including a steering arrangement according to the present invention. The vehicle has a cabin 12 which is mounted on a chassis 13. The vehicle 10 has front ground engaging wheels 14A and 14B which are steerable wheels. The vehicle also has rear ground engaging wheels 15A and 15B. In this case ground engaging wheels 15A and 15B are not steerable.

Within the cabin is a steering wheel 11. It can be used to turn the ground engaging steerable wheels about a generally vertical axis to steer the vehicle.

Figure 2:
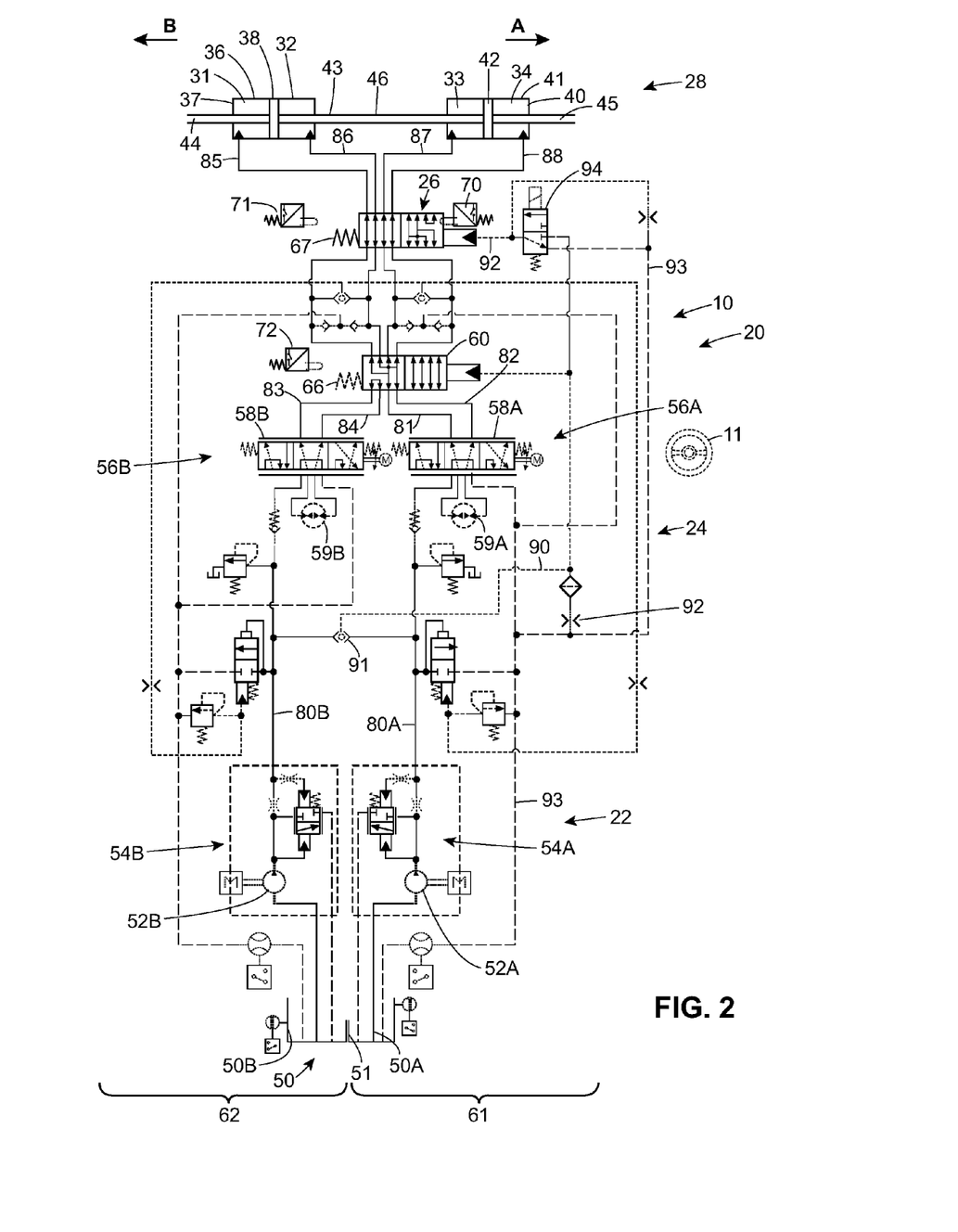
FIG. 2 is an embodiment of a steering arrangement according to the present invention.

With reference to FIG. 2, there is shown a steering arrangement 20. The main components of the steering arrangement are a pump system 22, a steering system 24, a steering ratio changeover valve 26 and a steering cylinder arrangement 28. The steering arrangement includes several back up, or "redundant" components such that in the event of failure of certain of the components, the vehicle 10 can still be steered.

The steering cylinder arrangement 28 includes a first hydraulic pressure chamber 31, a second hydraulic pressure chamber 32, a third hydraulic pressure chamber 33 and a fourth hydraulic pressure chamber 34. The first and second pressure chambers are defined as part of a double acting hydraulic ram 36 having a cylinder 37 and a piston 38. The third and fourth hydraulic chambers are defined as part of a double acting hydraulic ram 40 having a cylinder 41 and a piston 42. A rod 43 connects piston 38 to piston 42. A rod 44 connects piston 38 to a steering arm or the like of the front left wheel. A rod 45 connects the piston 42 to a steering arm or the like of the front right wheel. The cylinder 37 and 41 are fixed to the chassis/axle or the like of the vehicle. The pistons 38 and 42 and rods 43, 44 and 45 define a piston/rod assembly 46 that can move in the direction of arrow A (i.e. to the right when viewing FIG. 2) or in the direction of arrow B (i.e. to the left when viewing FIG. 2) in order to steer the vehicle as will be further described below.

In summary, supplying pressurised hydraulic fluid to one or other or both of the first and third hydraulic pressure chambers causes the piston/rod assembly 46 to move in the direction of arrow A thereby steering the vehicle in one direction. Alternatively, supplying pressurised hydraulic fluid to one or other or both of the second and fourth hydraulic pressure chambers causes the piston/rod assembly 46 to move in the direction of arrow B, thereby steering the vehicle in a second direction. Depending upon how the steering arms are connected to the wheels, movement of the piston/rod assembly 46 in the direction of arrow A may steer the vehicle to the right or it may steer the vehicle to the left.

The steering arrangement 20 includes a hydraulic fluid reservoir 50 which is divided into a first part 50A and a second part 50B by a dividing wall 51.

The pump system includes a first pump 52A and a second pump 52B. Both the first pump 52A and second pump 52B are driven by a motor M which in this case is the prime mover of the vehicle 10.

Associated with the first pump 52A is a flow control valve 54A which regulates the flow of pressurised fluid to the steering arrangement 20 with any excess fluid being returned to the hydraulic fluid reservoir 50.

Similarly, associated with the second pump 52B there is a flow control valve 54B which similarly regulates the flow of pressurised fluid to the steering arrangement 20, with excess fluid being returned to the hydraulic fluid reservoir 50.

The steering system 24 includes a first steering unit 56A and a second steering unit 56B. The first steering unit 56A consists of a first directional valve 58A in combination with a first metering unit 59A. Similarly, the second steering unit 56B consists of a second directional valve 58B in combination with a second metering unit 59B. Each steering unit 56A and 56B may define an orbitrol unit. Orbitrol units are well known in the art and they allow metered amounts of pressurised hydraulic fluid to be fed to steering cylinders to steer the vehicle either right or left as appropriate.

The steering wheel 11 is connected to both steering units 56A and 56B such that turning the steering wheel to the right will cause the first and second steering units 56A and 56B to direct pressurised hydraulic fluid to appropriate hydraulic pressure chambers such that the vehicle steers to the right and turning the steering wheel left causes the first and second steering units 56A and 56B to direct pressurised hydraulic fluid to appropriate hydraulic pressure chambers such that the vehicle steers to the left, as will be further described below.

General Operation of the Steering Arrangement is as Follows:

Normal Operation

The first pump 52A is arranged to draw hydraulic fluid from the first part 50A of the hydraulic fluid reservoir 50 and supply it as pressurised fluid to the first steering unit 56A. Depending upon a steering demand, dictated by the steering wheel the first steering unit will be arranged to feed pressurised hydraulic fluid to either the third hydraulic pressure chamber 33 if it is necessary to turn the vehicle in the first direction, or to the fourth hydraulic pressure chamber 34 if it is necessary to turn the vehicle in the second direction or to prevent any fluid being passed either the third or fourth hydraulic pressure chamber if it is necessary to maintain the current steering setting.

Similarly, the second pump 52B is arranged to draw hydraulic fluid from the second part 50B of the hydraulic fluid reservoir 50 and to deliver pressurised fluid to the second steering unit 56B. As mentioned above, the second steering unit 56B is connected to the first steering unit 56A (and to the steering wheel). The first and second steering unit therefore work in conjunction and the second steering unit delivers pressurised fluid either to the first hydraulic pressure chamber, or to the second hydraulic pressure chamber or prevents hydraulic fluid being passed to either the first or the second hydraulic pressure chamber, dependent upon the steering demand.

Thus, the first part 50A of the hydraulic fluid reservoir 50, first pump 52A, first steering unit 56A and the double acting hydraulic ram 40 provide a first steering system 61 and the second part 50B of the hydraulic fluid reservoir 50, second pump 52B, second steering unit 56B and the double acting hydraulic ram 36 provide a second steering system 62. As will be appreciated, the first steering system 61 together with the second steering system 62 provide a back up system, or a redundant system. Thus, if certain components of the first steering system 61 fail, then the vehicle can still be steered via the second steering system 62, and similarly if certain components of the second steering system 62 fail then the vehicle can still be steered via the first steering system 61.

Operation Following Pump Failure

The steering system also includes a valve 60, the operation of which is described in the applicant's co-pending European patent application 08154567.5, the contents of which are hereby incorporated by reference.

However, in summary valve 60 is a two position valve which is biased to the position as shown in FIG. 2 via spring 66 when the vehicle is not in use. When the prime mover M of the vehicle is started, the first and second pumps will generate a hydraulic pressure in hydraulic lines 80A and 80B. This in turn will cause a hydraulic pressure in the pilot line 90 by virtue of shuttle valve 91. Orifice 92 maintains the pressure in pilot line 90 such that the valve 66 moves to the position shown in FIG. 3. Under these circumstances (and with the steering ratio changeover valve 26 in the position as shown in FIG. 2) it can be seen that the first steering unit 56A supplies pressurised hydraulic fluid to the double acting hydraulic ram 40 and the second steering unit 56B supplies pressurised hydraulic fluid to the double acting hydraulic ram 36 as appropriate, depending upon steering demand.

Figure 3:
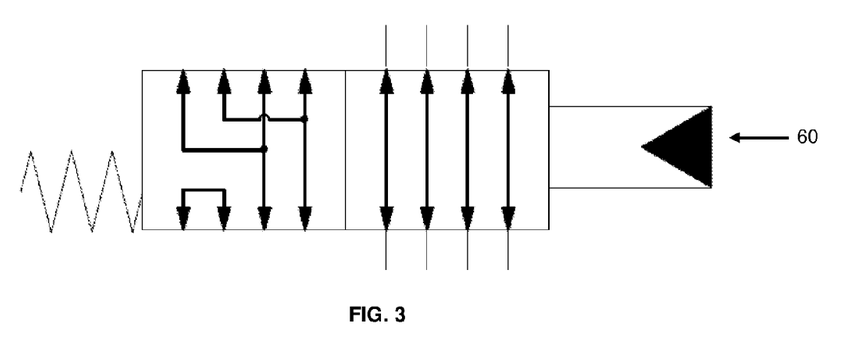
FIGS. 3 and 4 show certain valves of FIG. 2 in an alternative position.

In the event that both the first and second pumps are unable to supply pressurised hydraulic fluid, then the pressure in lines 80A and 80B will decay to zero and hence the pressure in pilot line 90 will decay to zero by virtue of hydraulic fluid passing through orifice 92 and returning to the hydraulic fluid reservoir via drain line 93. Under these circumstances the valve 60 will be moved to the position shown in FIG. 2 by spring 66. The valve therefore causes the output flow (contained either within hydraulic lines 81 and 82) of the first steering unit 56A to be fed to both double acting hydraulic ram 36 and double acting hydraulic ram 40. This output is not generated by the first and second pumps, rather it is generated by an operator turning the steering wheel which in turn rotates the metering unit 59A which generates the flow. Because the output from the metering unit 59A is being fed to two hydraulic rams, then the steering wheel must be rotated twice as far to obtain the same change in steering direction when compared with when the pumps are working and the valve 60 is in the position shown in FIG. 3. Thus, the steering ratio, i.e. the degrees turned by the front ground engaging wheels of the vehicle divided by the degrees turned by the steering wheel is lower with valve 60 positioned as shown in FIG. 2 then when valve 60 is positioned as shown in FIG. 3. By way of example, in one embodiment, when the valve is positioned as in FIG. 3 it may take four turns of the steering wheel to move from "lock to lock" (i.e. from full right hand lock to full left hand lock or vice versa) of the ground engaging wheels. However, when the valve 60 is in the position as shown in FIG. 2 it may require 8 turns of the steering wheel to go from lock to lock. This is advantageous since the force required to go from lock to lock with the valve in a positioned shown in FIG. 2 is therefore less, and since this force is generated by the operator, the operator is more able to steer the vehicle.

In summary, under normal operation, when the vehicle is being used, valve 60 will be in the position as shown in FIG. 3 and only exceptionally, if ever, when the vehicle is being used will the valve 60 be in the position shown in FIG. 2.

Thus, under normal circumstances, the steering wheel will require, in the above example, four turns to go from lock to lock.

Fast Steer

In summary, the steering ratio changeover valve 26 enables the normal steering ratio (in the above example four turns lock to lock) to be selectively altered to a higher ratio (for example two turns lock to lock).

In more detail, the steering ratio changeover valve 26, when in the position shown in FIG. 2, gives in the example, four turns lock to lock.

Figure 4:
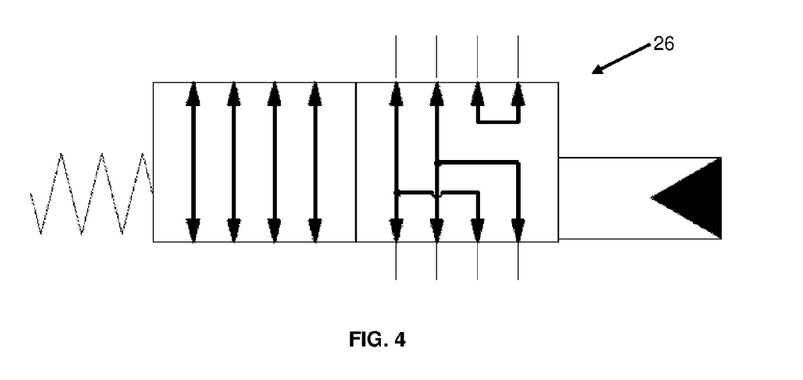

However, the valve 26 can be moved to the position as shown in FIG. 4 wherein it will only require in this example 2 turns lock to lock.

In more detail, changeover valve 26 is a pilot operated spool valve which is biased to the position shown in FIG. 2 by spring 67 but which can be moved to the position showed in FIG. 4 by application of a pilot pressure in pilot line 92. As shown in FIG. 2, with the vehicle in use, the pressure in pilot line 92 will have decayed to zero by virtue of it being connected to drain line 93. In the event that a higher steering ratio is required the operator can operate a switch or the like (not shown) connected to the steering select pilot valve 94 (which is a solenoid operated valve) so as to connect pilot line 90 to pilot line 92. Under these circumstances pilot line 92 will be pressurised (since the pilot line 90 will be pressurised as described above) thereby causing the steering ratio changeover valve 26 to move to the position shown in FIG. 4. Under these circumstances the output from the steering unit 56A (via hydraulic lines 81 or 82) and the output from steering unit 56B (via hydraulic lines 83 or 84) will all be directed to lines 85 and 86 of the double acting hydraulic ram 36. Significantly, none of the output from the first and second steering units 56 will be directed towards the double acting hydraulic ram 40. Instead, lines 87 and 88 associated with the double acting hydraulic ram 40 are coupled together via valve 26 when in the FIG. 4 position. Because of the output from both the steering units 56A and 56B is directed towards just one double acting hydraulic ram (ram 36) then this has the result of increasing the steering ratio. Significantly, the other double acting hydraulic ram (ram 40) is positioned in a float mode, i.e. the piston 42 is unrestricted in its movement and can freely move in the direction of arrow A or arrow B under the influence of piston 38.

A sensor in the form of switch 70 detects when the valve 26 is in the FIG. 2 position and a sensor in the form of switch 71 detects when the valve 26 is in the FIG. 4 position. A sensor in the form of switch 72 detects when the valve 60 is in the position shown in FIG. 3. This is for the purpose of a safety check.

Figure 5:
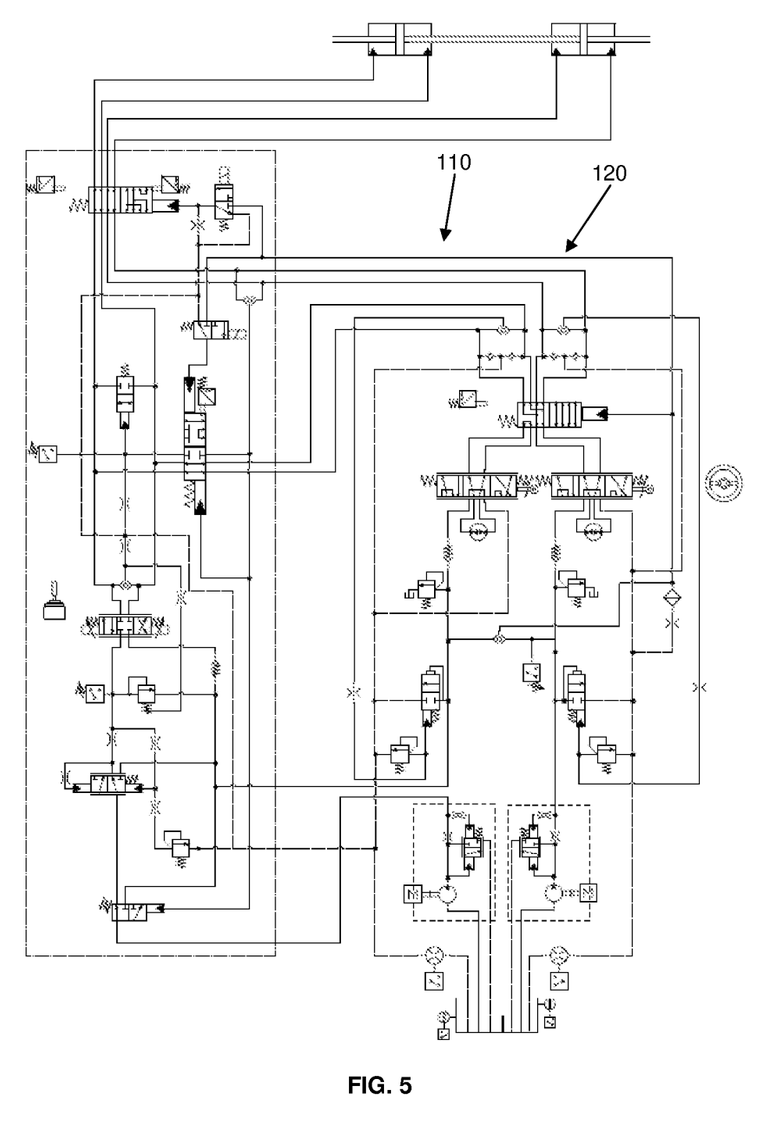
FIG. 5 is an embodiment of a steering arrangement according to the present invention.
Figure 5A:
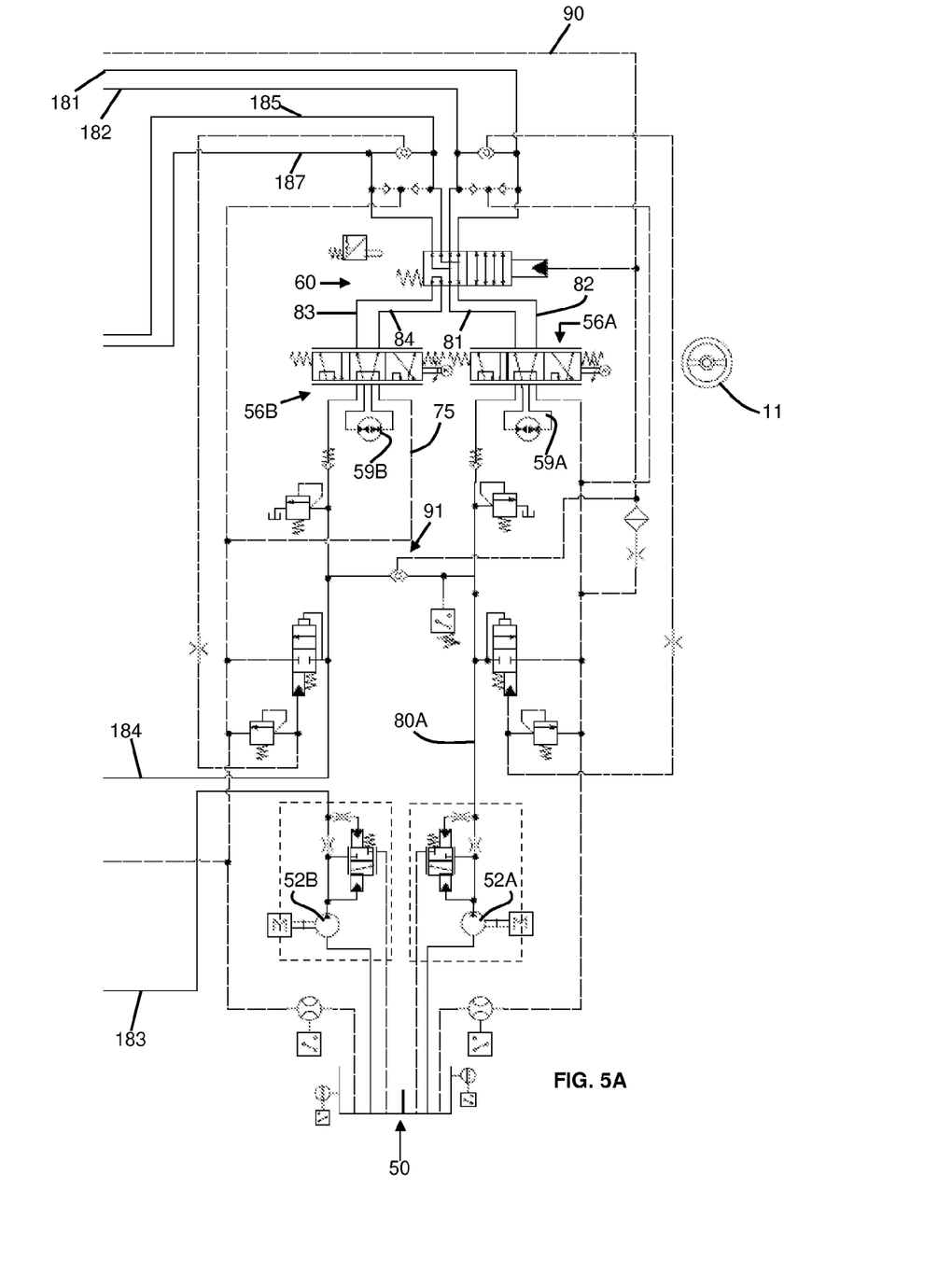
FIGS. 5A and 5B are part views of FIG. 5, FIGS. 6, 7 and 8 show valves of FIG. 5 in an alternative position.
Figure 5B:
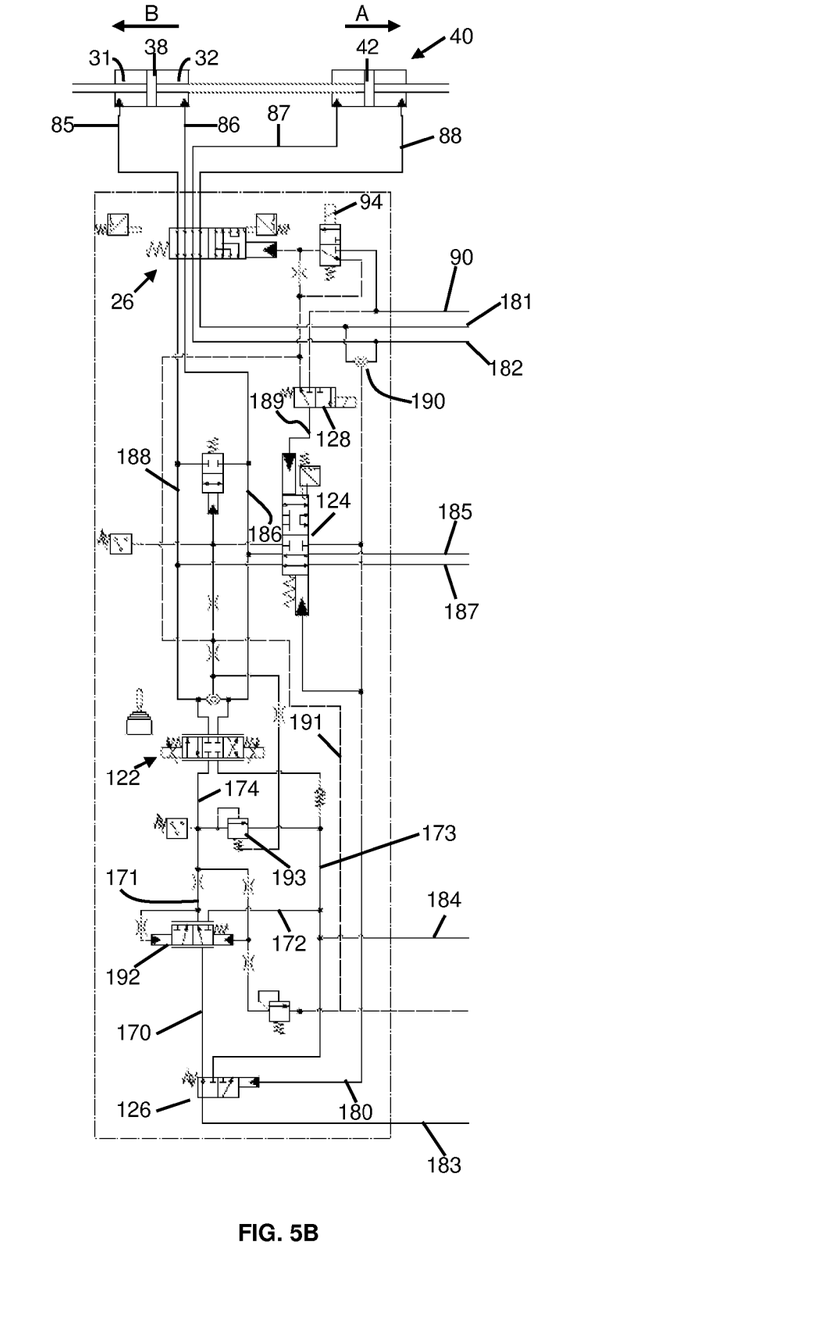
Figure 6:
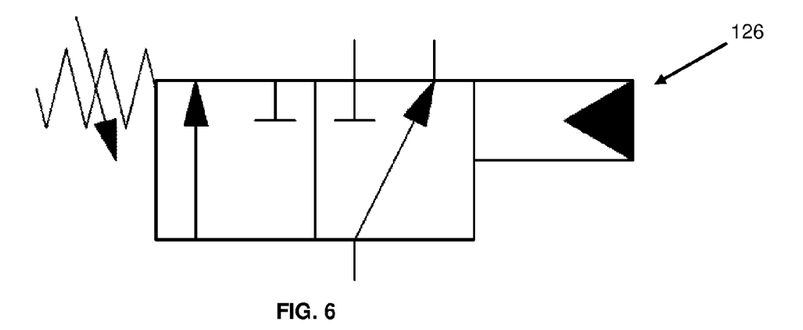

With reference to FIG. 5 there is shown a variant 120 of the steering arrangement 20. Components of steering arrangement 120 which fulfil the same function as those of steering arrangement 20 are labelled identically. Steering arrangement 120 is arranged on vehicle 110.

In summary, it is possible to operate the steering arrangement 120 in one of two ways. Firstly, the steering arrangement 120 can be steered by an operator turning steering wheel 11. Operation in this manner is as described above in relation to steering arrangement 20. Secondly, the steering arrangement 120 can be steered automatically by an automatic steering system, such as a GPS steering system. Under these circumstances, the GPS steering valve 122 can be automatically controlled to steer the vehicle.

The steering arrangement 120 can be selectively changed between operator steering (manual steering) and automatic steering (GPS steering) by changing the GPS steering select spool valve 124.

In More Detail:—

Normal Steering

With the vehicle 110 in use and in normal steering operation, the GPS steering select spool valve 124 will be in the position as shown in FIG. 5. The GPS steering safety cut off valve 126 will be in the position as shown in FIG. 5. Accordingly, pressurised fluid from pump 52B will flow into line 183 through the GPS steering safety cut off valve 126 and into line 170 and hence on to the GPS steering flow regulator valve 192.

GPS steering flow regulator valve 192 is a proportional valve and accordingly will connect line 170 to one or other or both of hydraulic lines 171 or 172. Hydraulic fluid flowing through line 172 will flow into line 184 and hence on to the second steering unit 56B. Hydraulic fluid flowing through line 171 will be prevented from flowing through the GPS steering valve 122 and hence will flow through the GPS steering neutral circuit valve 193 and into line 173 and then through line 184 hence onto the second steering unit 56B. Accordingly, the second steering unit 56B is supplied by pressurised fluid from the second pump 52B in a similar manner to the steering arrangement 20 although this pressurised fluid does pass through the GPS steering safety cut off valve 126 and the GPS steering flow regulator valve 192, and some of the fluid passes through the GPS steering neutral circuit valve 193.

Hydraulic lines 81 and 82 of steering arrangement 120 are connected to hydraulic lines 87 and 88 respectively in a similar manner to steering arrangement 20 (when the valve 60 is in the FIG. 3 position and the valve 26 is in the FIG. 5 position). Line 84 is connected to line 185 (when valve 60 is in the FIG. 3 position) which in turn is connected to line 186 (via the GPS steering select spool valve 124 when in the FIG. 5 position) which in turn is connected to line 86 (when the steering ratio changeover valve 26 is in the FIG. 5 position). Accordingly, line 84 of steering arrangement 120 is connected to line 86 in a similar manner to steering arrangement 20, albeit via the GPS steering select spool valve. Similarly, line 83 is connected to line 187 (when the valve 60 is in the FIG. 3 position) which in turn is connected to line 188 (via the GPS steering select spool valve 124 when in the FIG. 5 position) which in turn is connected to line 85 (when the steering ratio changeover valve 26 is in the FIG. 5 position). Accordingly, line 83 of steering arrangement 120 is connected to line 85 in a similar manner to the steering arrangement 20, albeit via the GPS steering select spool valve 124. Thus, as will be appreciated, the connections between the pumps 52A and 52B, the steering units 52A and 52B, and the hydraulic rams 36 and 40 as shown in steering arrangement 120 when in the normal mode of operation are functionally equivalent to the connections of the same components in steering arrangement 20 when it is in its normal mode of operation. Accordingly, steering of the steering arrangement 120 when its normal mode (also referred to herein as a primary mode) is as described above with reference to the steering of steering arrangement 20 when its normal mode of operation.

Automatic Steering

Figure 7:
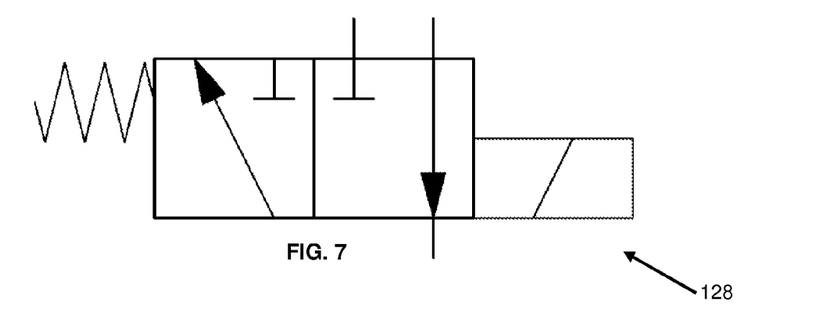
Figure 8:
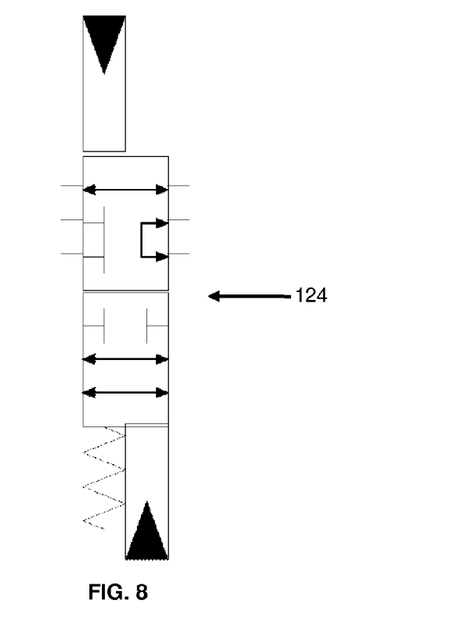

When automatic steering is desired, the operator will activate a switch or the like (not shown) connected to the solenoid valve 128 such that valve 128 moves to the FIG. 7 position which will cause the pressure in hydraulic line 90 to be transmitted to pilot line 189 which in turn will cause the GPS steering select spool valve 124 to move to the FIG. 8 position. Once in this position, steering flow to and from hydraulic lines 85 and 86 is provided via the GPS steering valve 122. GPS steering valve 122 is a proportional valve and is controlled via a GPS steering system which determines automatically where the machine is to be steered. Such GPS steering systems are known and are useful, for example when ploughing a field or carrying out other agricultural operations in a field such as spraying. Such GPS steering systems may be more accurate than when the vehicle is being manually steered, and as such will prevent one part of a field being ploughed twice or sprayed twice, and will prevent one part of a field not being ploughed or not being sprayed for example. Furthermore, such automatic steering systems help reduce operator fatigue.

Depending upon the steering demand, the GPS steering valve 122 will direct pressurised fluid from hydraulic line 174 into line 188 and on to line 85 and into the first hydraulic pressure chamber 31 to steer the vehicle in the first direction, or the GPS steering valve will direct pressurised fluid into line 186 and then into line 86 and into the second hydraulic pressure chamber 32 to steer the vehicle in the second direction, or, if there is no steering demand, the GPS steering valve 122 will be positioned as shown in FIG. 5 thereby maintaining the current steering position. As will be appreciated, in the event pressurised fluid is provided into the first hydraulic pressure chamber, fluid in the second hydraulic pressure chamber 32 will be returned to the hydraulic fluid reservoir via hydraulic line 86, hydraulic line 186, via GPS steering valve 122, via hydraulic line 173 and 184, through the second steering unit 56B through line 83, through valve 60 (when in the FIG. 3 position) through line 187 through the GPS steering select spool valve 124 when in the FIG. 8 position, through line 185, through valve 60 when in the FIG. 3 position through the second steering unit 56 to tank via drain line 75. Similarly, if the GPS steering valve 122 supplies pressurised fluid to the second hydraulic pressure chamber 32, then hydraulic fluid leaving the first hydraulic pressure chamber 31 will be returned to the hydraulic fluid reservoir via a similar route.

As the piston 38 is caused to move in the direction of arrow A or arrow B as the GPS steering valve 122 is operated, then in turn, the piston 42 will similarly move in the direction of arrow A or arrow B as appropriate. This will cause a flow of hydraulic fluid within lines 87 and 88 which will result in fluid flow in lines 81 and 82, and hence in steering unit 59A causing the steering unit to rotate, and hence causing the steering wheel 11 to rotate. As the steering unit 59A and steering wheel 11 rotate then similarly the steering unit 59B will rotate. This will allow for the above mentioned return flow in lines 83 and 84.

In summary, when steering in automatic mode (also referred to herein as a secondary mode) the pump 52B supplies pressurised hydraulic fluid to the GPS steering valve 122. The GPS steering valve 122 then directs pressurised hydraulic fluid to one or other or neither of the first and second hydraulic pressure chambers 31 and 32 and also directs return flow from the first or second hydraulic pressure chambers to the hydraulic fluid reservoir 50. As the piston 38 moves in the direction of arrow A or arrow B, then in turn the piston 42 moves similarly, which in turn causes flow through the metering unit 59A which causes the steering wheel to rotate. Rotation of the metering unit 59A and steering wheel 11 causes rotation of the metering unit 59B and this rotation is possible by virtue of the output lines 83 and 84 being connected together at the GPS steering select spool valve 124 when in the FIG. 8 position.

The flow from pump 52A will be metered through the first metering unit 59A as it rotates as a result of a steering demand.

Operation Following Pump Failure

The steering arrangement 120 operates in a similar manner to the steering arrangement 20 in the event that both the first and second pumps are unavailable to supply pressurised hydraulic fluid. In short, under these circumstances the valve 60 moves from the FIG. 3 position to the FIG. 2 position resulting in a lower steering ratio.

Fast Steer

The steering arrangement 120 operates in a similar manner to steering arrangement 20 when in a fast steer mode. In summary, in fast steer mode the steering ratio changeover valve 26 moves from the FIG. 5 position to the FIG. 4 position thereby resulting in higher steering ratio.

Figure 9:
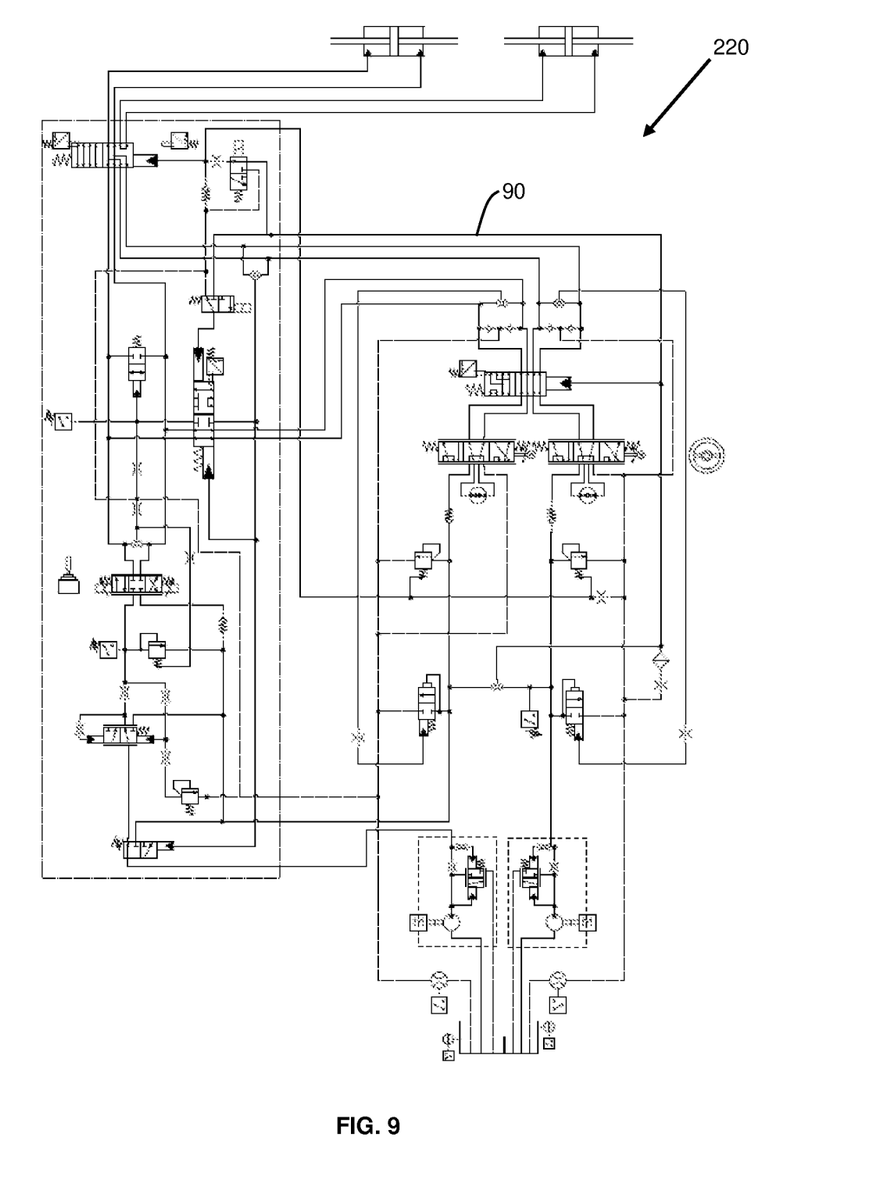
FIG. 9 is an embodiment of a steering arrangement according to the present invention.
Figure 9A:
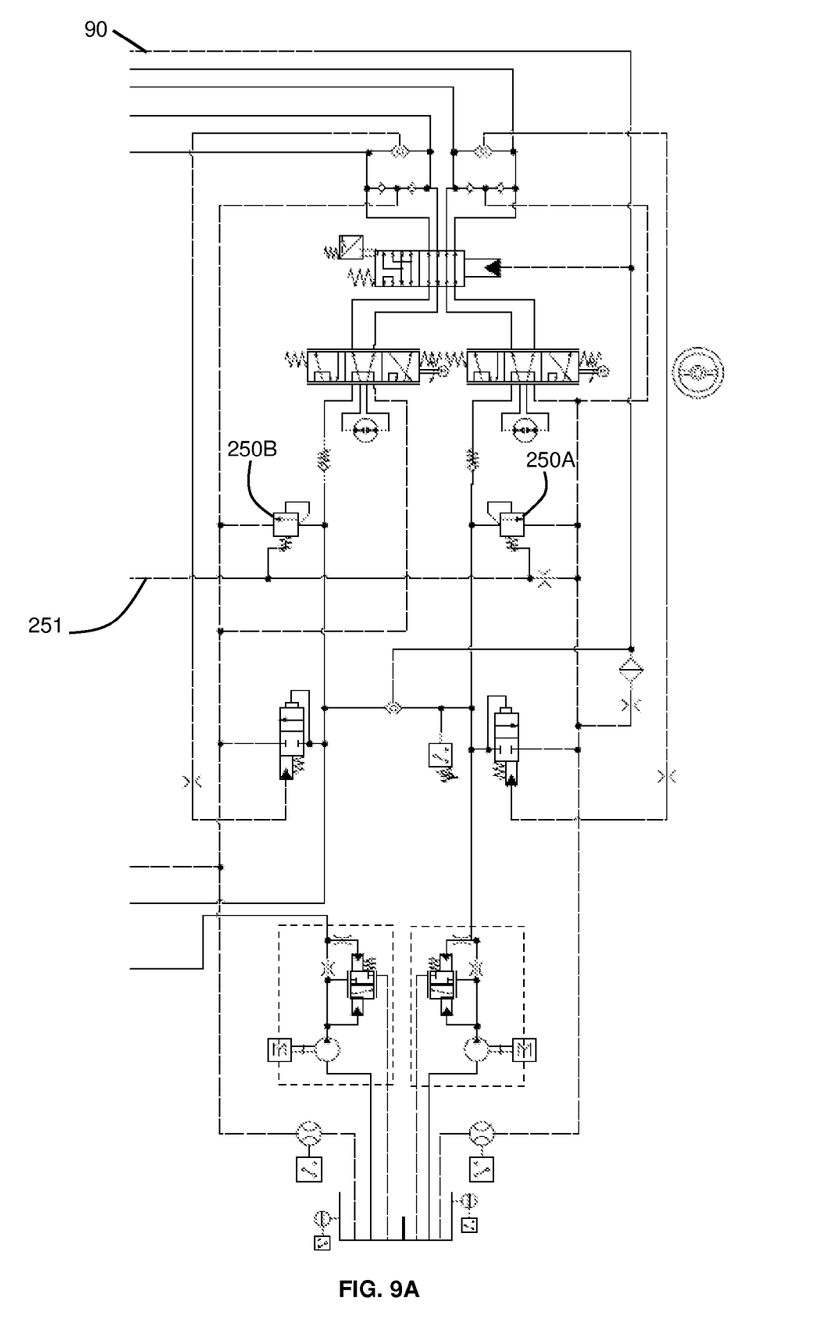
FIGS. 9A and 9B are part views of FIG. 9.
Figure 9B:
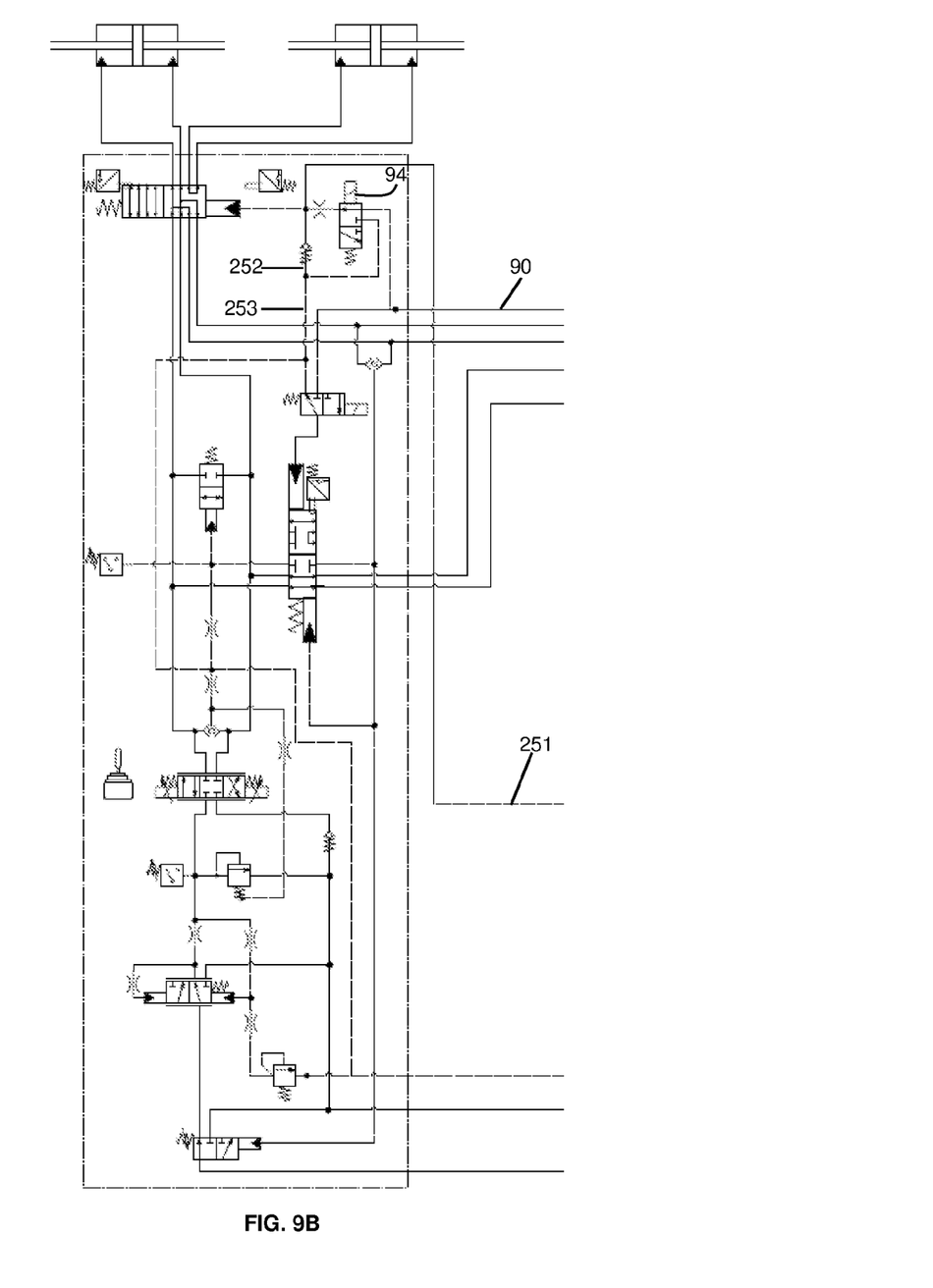

FIG. 9 shows a steering arrangement 220 which is a variant of the steering arrangement 120. Components of steering arrangement 220 which operate in a similar manner to steering arrangement 120 are labelled identically. Steering arrangement 220 includes first and second sequence relief valves 250A and 250B. These valves are connected via pilot line 251 to check valve 252.

In summary, the sequence relief valves 250A and 250B in combination with the check valve 252 to allow for an increase in the pressure being supplied to steer the vehicle when in the fast steer mode than when compared with the normal mode. This increase in pressure may be desirable to compensate for the effective reduction in piston area when operating in this mode.

Thus when in the normal mode, the steering select pilot valve 94 shown in FIG. 9 is in the position of the steering select pilot valve 94 shown in FIG. 2 and hence the pilot line 251 is connected to drain line 253 and hence there is no pressure in line 251 and hence the sequence relief valves 250A and 250B will open at, in one example, 100 bar. However, when the fast steer mode is selected and the steering select pilot valve 94 of FIG. 9 is moved to the position as shown in FIG. 9, then pilot line 90 will pressurise line 251 but only to the cracking pressure of the check valve 252, in one example 60 bar. Thus, the 60 bar pressure in line 252 supplements the springs within the sequence relief valves 250A and 250B resulting in an increased relief pressure, in this example 160 bars for sequence relief valves 250A and 250B.

As shown in FIG. 2 the first and second hydraulic pressure chambers are contained within the double acting hydraulic ram 36 and the third and fourth hydraulic chambers are contained within the double acting hydraulic ram 40. In this example the rod 43 serves both the double acting hydraulic ram 36 and the double acting hydraulic ram 40. In further embodiments rod 43 may be in two parts with one part serving the double acting hydraulic ram 36 and the second part serving the double acting hydraulic ram 40 with the two parts being distinct parts which are operably coupled together. In one example, where rod 43 may be two parts being distinct parts, each part may be connected to an associated steering arm with the two steering arms in turn being connected together via a track rod.

Figure 10:
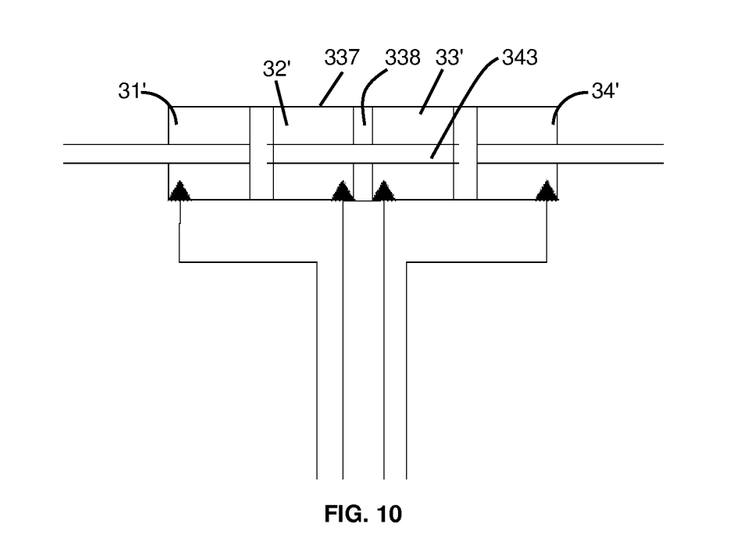
FIG. 10 shows a cylinder arrangement which can be used for the present invention.

FIG. 10 shows a variant wherein the first hydraulic pressure chamber 31', the second hydraulic pressure chamber 32', the third hydraulic pressure chamber 33' and the fourth hydraulic pressure chamber 34' are all contained within a single cylinder 337. A wall (or centre gland) 338 isolates the second hydraulic pressure chamber 32' from the third hydraulic pressure chamber 33' wherein suitable seals engage the rod 343.

Figure 11:
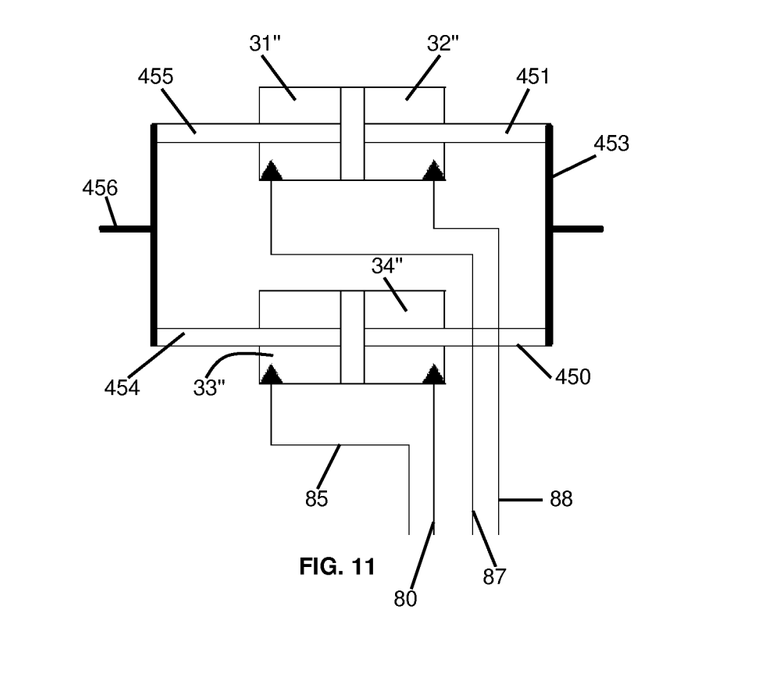
FIG. 11 shows a cylinder variant which can be used with the present invention.

As shown in FIG. 2 and FIG. 10, the first, second, third and fourth hydraulic pressure chambers are in series. FIG. 11 shows an arrangement whereby the first and second hydraulic pressure chambers 31" and 32" are in parallel with the third and fourth hydraulic pressure chambers 33" and 34". Rod 450 and rod 451 are coupled together by coupling 453 (shown schematically). Similarly, rod 454 and rod 455 are coupled together by coupling 456 (shown schematically). Couplings 453 and 456 are connected via a suitable linkage to the steered ground engaging wheels or the like.

The invention has been described in respect of a front wheel steered vehicle. However, the invention is equally applicable to vehicles in which the rear wheels steer, or alternatively in respect of vehicles which have centre point steering (also known as articulated steering).

As described above, rods 43, 44 and 45 are described as separate rods. These rods can be attached by an suitable means either to each other, or to an associated piston. The attachment means could be a threaded attachment. However, in further embodiments rod 43 and 44 could be a single unitary rod, rods 44 and 45 could be a single unitary rod, or rods 43, 44 and 45 could all be a single unitary rod.

As described above, motor M is the prime mover of the vehicle, for example a diesel engine. As will be understood, any type of prime mover can be used. The prime mover may drive the pump via a gear box or the like. However, in further embodiments other types of prime mover other than an internal combustion engine such as a diesel engine might be used.

One aspect of the present invention uses an automatic steering system, for example a GPS steering system. Other types of automatic steering systems could be used, for example, a lane guidance automatic steering system for use on roads could be used. Alternatively, the guidance may be via any form of guidance system e.g. laser guidance.

When the present invention relates to automatic steering systems, such automatic steering systems may be in conformity with UNECE regulation number 79, Uniform Provisions Concerning the Approval of vehicles with Regard to Steering Equipment.

The invention claimed is:

1. A steering arrangement including a first hydraulic pressure chamber, a second hydraulic pressure chamber, a third hydraulic pressure chamber and a fourth hydraulic pressure chamber, the first and third pressure chambers being selectively operable to steer in a first direction and the second and fourth pressure chambers being selectively operable to steer in a second direction,
   a pump system for supplying pressurised fluid to a steering system,
   the steering system being operable to supply the pressurised fluid to one or more of the first, second, third and fourth hydraulic pressure chambers,
   the steering system having a first mode wherein pressurised fluid is simultaneously supplied to the first and third hydraulic pressure chambers to steer in the first direction or wherein pressurised fluid is simultaneously supplied to the second and fourth hydraulic pressure chambers to steer in the second direction,
   the steering system having a second mode wherein pressurised fluid is supplied to one of the first and third hydraulic pressure chambers to steer in the first direction or wherein pressurised fluid is supplied to one of the second and fourth hydraulic pressure chambers to steer in the second direction,
   such that the steering ratio is higher in the second mode than in the first mode.

2. A steering arrangement as defined in claim 1 wherein with the steering system in the second mode, pressurised fluid is supplied only to one of the first and third hydraulic pressure chambers to steer in the first direction or pressurised fluid is supplied only to one of the second and fourth hydraulic pressure chambers to steer in the second direction.

3. A steering system as defined in claim 1 including:
   a first steering unit,
   a second steering unit,
   wherein with the steering system in the first mode:
   the first steering unit selectively supplies pressurised fluid to one of the first or third chamber simultaneously with the second steering unit supplying pressurised fluid to the other of the first or third chamber to steer in the first direction, or
   the first steering unit selectively supplies pressurised fluid to one of the second or fourth chamber simultaneously with the second steering unit supplying pressurised fluid to the other of the second or fourth chamber to steer in the second direction.

4. A steering arrangement as defined in claim 3 in which with the steering system in the second mode the first steering unit selectively supplies pressurised fluid to one of the first and third hydraulic pressure chambers simultaneously with the second steering unit supplying pressurised fluid to said one of the first and third hydraulic pressure chambers to steer in the first direction, or
   the first steering unit selectively supplies pressurised fluid to one of the second and fourth hydraulic pressure chambers simultaneously with the second steering unit supplying pressurised fluid to said one of the second and fourth hydraulic pressure chambers to steer in the second direction.

5. A steering arrangement as defined in claim 4 including a valve having a first position which defines the first mode and a second position which defines the second mode.

6. A steering arrangement as defined in claim 5 when the valve is a pilot operated valve or a solenoid operated valve.

7. A steering arrangement as defined in claim 5 including a first sensor for sensing when the valve is in the first position and/or including a second sensor for sensing when the valve is in the second position.

8. A steering arrangement as defined in claim 3 wherein the pump system includes a first pump for supplying pressurised fluid to the first steering unit and a second pump for supplying pressurised fluid to the second steering unit.

9. A steering arrangement as defined in claim 1 wherein pressurised fluid is supplied to one or more of the first, second, third and fourth hydraulic pressure chambers when the steering system is in the first mode at a pressure lower than the pressure of the fluid supplied to one or more of the first, second, third and fourth hydraulic pressure chambers when the steering system is in the second mode.

10. A steering arrangement as defined in claim 9 wherein a relief valve is arranged to relieve the pressure of the pressurised fluid at a first level when the steering system is operating in the first mode and is arranged to relieve pressure at a second level, higher than the first level when the steering system is operating in the second mode.

11. A steering arrangement as defined in claim 3 wherein the steering system has a third mode wherein only one of the first steering unit and second steering unit selectively supplies fluid to the first and third hydraulic pressure chamber to steer in a first direction; or said only one of the first steering unit and second steering unit selectively supplies fluid to the second and fourth hydraulic pressure chamber to steer in the second direction;

such that the steering ratio is lower in the third mode than in the first mode.

12. A steering arrangement as defined in claim 1 wherein the steering arrangement has a fourth mode wherein pressurised fluid is supplied by an automatic steering system to one of the first and third hydraulic pressure chambers to steer in the first direction or wherein pressurised fluid is supplied by the automatic steering system to one of the second and fourth hydraulic pressure chambers to steer in the second direction.

13. A steering arrangement including a first hydraulic pressure chamber, a second hydraulic pressure chamber, a third hydraulic pressure chamber and a fourth hydraulic pressure chamber, the first and third pressure chambers being selectively operable to steer in a first direction and the second and fourth pressure chambers being selectively operable to steer in a second direction,
- a pump system for supplying pressurized fluid to a steering system,
- the steering system being operable to supply the pressurized fluid to one or more of the first, second, third and fourth hydraulic pressure chambers,
- the steering system having a primary mode wherein pressurized fluid is simultaneously supplied to the first and third hydraulic pressure chambers to steer in the first direction or wherein pressurized fluid is simultaneously supplied to the second and fourth hydraulic pressure chambers to steer in the second direction, and
- the steering system having a secondary mode wherein pressurized fluid is supplied by an automatic steering system to only the first hydraulic pressure chamber to steer in the first direction or wherein pressurized fluid is supplied by an automatic steering system to only the second hydraulic pressure chamber to steer in the second direction.

14. A steering arrangement as defined in claim 13 wherein with the steering system in the secondary mode, the third pressure chamber is connected to the fourth pressure chamber.

15. A steering system as defined in claim 13 including
a first steering unit,
a second steering unit,
wherein with the steering system in the primary mode,
the first steering unit selectively supplies pressurized fluid to one of the first or third chamber simultaneously with the second steering unit supplying pressurized fluid to the other of the first or third chamber to steer in the first direction, or
the first steering unit selectively supplies pressurized fluid to one of the second or fourth chamber simultaneously with the second steering unit supplying pressurized fluid to the other of the second or fourth chamber to steer in the second direction.

16. A steering arrangement as defined in claim 15 wherein with the steering system in the secondary mode, the third pressure chamber is connected via one of the first and second steering units to the fourth pressure chamber.

17. A steering arrangement as defined in claim 16 wherein with the steering system in the secondary mode the other of the first and second steering units is in a float mode.

18. A steering arrangement as defined in claim 17 in which a first output of the other of the first and second steer unit is connected to a second output of the other of the first and second steer unit to provide the float mode.

* * * * *